US009508386B2

(12) United States Patent
Vilermo et al.

(10) Patent No.: US 9,508,386 B2
(45) Date of Patent: Nov. 29, 2016

(54) METHOD AND APPARATUS FOR SYNCHRONIZING AUDIO AND VIDEO SIGNALS

(71) Applicant: Nokia Corporation, Espoo (FI)

(72) Inventors: Miikka Tapani Vilermo, Siuro (FI); Mikko Tapio Tammi, Tampere (FI); Arto Juhani Lehtiniemi, Lempaala (FI); Lasse Juhani Laaksonen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/317,861

(22) Filed: Jun. 27, 2014

(65) Prior Publication Data

US 2015/0380054 A1 Dec. 31, 2015

(51) Int. Cl.
*H04N 5/932* (2006.01)
*H04N 5/92* (2006.01)
(Continued)

(52) U.S. Cl.
CPC .............. *G11B 27/10* (2013.01); *G10L 21/055* (2013.01); *G11B 27/005* (2013.01); *H04N 5/04* (2013.01); *H04N 5/76* (2013.01); *H04N 5/77* (2013.01); *H04N 9/806* (2013.01); *H04N 21/2368* (2013.01); *H04N 21/4307* (2013.01); *H04N 21/4398* (2013.01); *H04S 3/008* (2013.01);
(Continued)

(58) Field of Classification Search
CPC ........... G11B 27/10; H04N 5/04; H04N 5/76
USPC ........ 386/201, 248, 323, 314, 321, 338, 340
See application file for complete search history.

(56) References Cited

U.S. PATENT DOCUMENTS 5,583,652 A 12/1996 Ware
6,232,540 B1 5/2001 Kondo
(Continued)

FOREIGN PATENT DOCUMENTS

CA 2474197 A1 7/2003
EP 1918911 A1 * 5/2008 ............. G10L 19/12
(Continued)

OTHER PUBLICATIONS

Makino, S. et al., *Blind Source Separation of Convolutive Mixtures of speech in Frequency Domain*, IEICE Transactions on Fundamental of Electronics, Communications and Computer Sciences, vol. E88-A (Jul. 2005),pp. 1640-1655.
(Continued)

*Primary Examiner* — Robert Chevalier
(74) *Attorney, Agent, or Firm* — Alston & Bird LLP

(57) ABSTRACT

A method, apparatus and computer program product are provided to synchronize audio signals with video images that are replayed with a modified motion. In a method, a trajectory is determined for each audio object of an audio signal. The method also determines each of the audio objects to be a transient or non-transient object. The method also causes a respective audio object to be differently extended depending upon whether the audio object is determined to be a transient object or a non-transient object, thereby synchronizing video signals that are to be played back with a predefined motion. The method causes the respective audio object to be differently extended by splitting the transient object into transient segments, inserting silent segments therebetween and maintaining the trajectories of the transient object and/or by repeating the non-transient object with a trajectory that varies based on the predefined motion of the video signals.

20 Claims, 12 Drawing Sheets

(51) Int. Cl.

| | |
|---|---|
| G11B 27/10 | (2006.01) |
| H04N 5/04 | (2006.01) |
| H04N 5/76 | (2006.01) |
| G10L 21/055 | (2013.01) |
| G11B 27/00 | (2006.01) |
| H04N 21/2368 | (2011.01) |
| H04N 5/77 | (2006.01) |
| H04N 9/806 | (2006.01) |
| H04S 3/00 | (2006.01) |
| H04N 21/43 | (2011.01) |
| H04N 21/439 | (2011.01) |
| G10L 21/047 | (2013.01) |
| G10L 25/78 | (2013.01) |

(52) U.S. Cl.
CPC .............. *G10L21/047* (2013.01); *G10L 25/78* (2013.01); *H04S 2400/11* (2013.01)

(56) References Cited

U.S. PATENT DOCUMENTS

| | | |
|---|---|---|
| 7,818,077 B2 | 10/2010 | Bailey |
| 2005/0166101 A1 | 7/2005 | Alexandre |
| 2013/0177168 A1 | 7/2013 | Inha et al. |

FOREIGN PATENT DOCUMENTS

| | | |
|---|---|---|
| EP | 2 509 073 A1 | 10/2012 |
| EP | 2 680 616 A1 | 1/2014 |
| JP | 2013-162370 A | 8/2013 |
| KR | 2003 0024770 A | 3/2003 |
| WO | WO 2012/047426 A1 | 4/2012 |

OTHER PUBLICATIONS

Mellor, D., Sound & Sync [online] [retrieved Feb. 3, 2014]. Retrieved from the Internet: <URL: http://www.soundonsound.com/sos/apr11/articles/simple-sound-sync.htm>. (dated Apr. 2011) 4 pages.

Mukai, R. et al., *Robust Real-Time Blind Source Separation for Moving Speakers in a Room*, ICASSP (2003), pp. V469-V472.

Ney, H. et al., *The RWTH Large Vocabulary Continuous Speech Recognition System*, IEEE International Conference on Acoustics, Speech and Signal Processing (ICASSP) (1998), pp. 1-4.

Parra, L. et al., *On-Line Convolutive Blind source Separation of Non- Stationary Signals*, Journal of VLSI Signal Processing Systems for Signal, Image and Video Technology, vol. 26, Issue 1-2 (Aug. 2000) pp. 39-46.

Ramana Rao, G. V. et al., *Word Boundary Detection Using Variations*, Fourth International Conference on Spoken Language, Department of Computer Science and Engineering, Indian Institute of Technology (May 2, 1996)pp. 813-816.

Sadek, R. et al., *A Novel Multichannel Panning Method for Standard and Arbitrary Loudspeaker Configurations*, 117 AES Convention (Oct. 2004) pp. 1-5.

Sohn, J. et al., *A Statistical Model-Based Voice Activity Detection*, Signal Processing Letters, IEEE Signal Processing Letters, vol. 6, No. 1 (Jan. 1999), pp. 1-3.

Wu, Gin-Der et al., *A Recurrent Neural Fuzzy Network for Word Boundary Detection in Variable Noise-Level Environments*, IEEE Transactions on System, Man and Cybernetics, Part B: Cybernetics, vol. 31, Issue 1 (Feb. 2001) pp. 84-87.

Office Action for European Application No. EP 15 17 1781 dated Oct. 6, 2015.

Sanjaume, J. B., *Audio Time-Scale Modification in the Context of Professinal Audio Post-Production*, Universitat Pompeu Fabra, Barcelona (2002) pp. 1-84.

Moinet, A., *Slowdio: Audio Time-Scaling for Slow Motion Sports Videos*, Faculty of Engineering of the University of Mons, (dated Sep. 26, 2013), pp. 1-208.

Sawada, H. et al., *MLSP 2007 Data Competition: Frequency-Domain Blind Source Separation for Convolutive Mixtures of Speech/Audio Signals*, Machine Learning for Signal Processing, 2007 IEEE Workshop (2007) 6 pages.

\* cited by examiner

METHOD AND APPARATUS FOR SYNCHRONIZING AUDIO AND VIDEO SIGNALS

TECHNOLOGICAL FIELD

An example embodiment of the present invention relates generally to the synchronization of audio and video signals and, in one embodiment, relates to maintaining synchronization between the audio and video signals in an instance in which a video signals are replayed with modified motion, such as in slow motion.

BACKGROUND

It is sometimes desirable to replay a sequence of video images in slow motion. For example, a user may provide input that specifies the extent to which the replayed video images should be slowed. In instances in which mono audio signals have been captured and are associated with the video images, the replay of the audio signals may correspondingly be slowed to the same extent that the replay of the video images is slowed.

Increasingly, however, stereo or multi-channel audio signals are captured and associated with a sequence of video images. In an instance in which video images that are associated with stereo or multi-channel audio signals are replayed in slow motion, it may be somewhat problematic to properly replay the stereo or multi-channel audio signals in a manner that maintains synchronization with the slowed video images. In this regard, synchronization may apply not only to the relative timing of the audio signals and the video images, but also to the synchronization of the direction associated with the audio signals relative to the location of the source of the audio signals within the video images.

The replay of audio signals at a slower speed in conjunction with video images that are displayed in slow motion may be problematic as stereo or multi-channel audio signals generally sound unnatural when played at a different speed. In order to permit the audio signals to sound more natural, the audio signals may be played at standard speed, but the audio signals will then be out of synchronization relative to the corresponding video images that are replayed in slow motion. Various techniques have been developed in an effort to facilitate changes in the audio playback speed, but these techniques may only provide audio signals with reasonable quality in instances in which the audio signals and the corresponding video images are slowed to about half speed and generally do not maintain synchronization with audio signals that continue to sound natural in instances in which the audio signals and the corresponding video images are slowed to a greater degree.

BRIEF SUMMARY

A method, apparatus and computer program product are provided in accordance with an example embodiment in order to facilitate synchronization of audio signals with corresponding video images that are replayed with a modified motion, such as in slow motion. In this regard, the method, apparatus and computer program product of an example embodiment may maintain the audio signals in synchronization with the corresponding video images, both in terms of time and direction. Further, the method, apparatus and computer program product of an example embodiment may permit the audio signals associated with video images that are replayed with the modified motion to maintain synchronization with the video images in a manner that still permits the audio signals to sound relatively natural. A method, apparatus of computer program product are also provided in accordance with another example embodiment to associate audio signals with at least a part of a video image that is stationary and/or to correspondingly remove audio signals that are associated with a part of a video image that has been removed.

In an example embodiment, a method is provided that includes determining a trajectory for each of one or more audio objects of an audio signal. The method of this embodiment also includes determining each of the audio objects to be a transient object or a non-transient object. For example, the transient and non-transient objects may include speech and non-speech objects, respectively. The method of this example embodiment also includes causing, with a processor, an audio object to be differently extended depending upon whether the audio object is determined to be a transient object or a non-transient object so as to synchronize a video signal that is to be played back in a predefined motion, such as slow motion. In this regard, the method may cause the audio object to be differently extended, in an instance in which the audio object is determined to be a transient object, by splitting the transient object into transient segments, inserting silent segments between the transient segments and maintaining the trajectories of the transient object. The method of this embodiment may also cause the audio object to be differently extended, in an instance in which the audio object is determined to be a non-transient object, by repeating the non-transient object with a trajectory that varies over time in correspondence to the predefined motion of the video signal.

The method of an example embodiment may also include determining a level for each of the one or more audio objects. In this embodiment, the method may cause the audio object to be differently extended by maintaining the level of the transient object and repeating the non-transient object at a level that varies over time in correspondence to the predefined motion of the video signal. The method of an example embodiment may insert silent segments between the transient segments by inserting silent segments that have a length that corresponds to the predefined motion of the video signal. In this embodiment, a first speed of the audio and video signals may be a multiple of the predefined motion speed at which the video signal is to be played back. As such, the method may insert silent segments that have a length that is selected such that the silent segments in combination with a corresponding transient segment have a collective length that is the multiple of a length of the corresponding transient segment at the first speed. In an instance in which the first speed of the audio and video signals is a multiple of the predefined motion speed at which the video signal is to be played back, the method may repeat the non-transient objects by repeating a non-transient object to have a resulting length that is the multiple of the length of the non-transient object at the first speed. The method of an example embodiment may also include causing the audio object to be rendered after having been differently extended.

In another example embodiment, an apparatus is provided that includes at least one processor and at least one memory storing computer program code with the at least one memory and the stored computer program code being configured, with the at least one processor, to cause the apparatus to at least determine a trajectory for each of one or more audio objects of an audio signal and to determine each of the audio objects to be a transient object or a non-transient object. For example, the transient and non-transient objects may include speech and non-speech objects, respectively. The at least one memory and the stored computer program code are also configured, with the at least one processor, to cause the apparatus of this example embodiment to cause an audio object to be differently extended depending upon whether the audio object is determined to be a transient or a non-transient object so as to synchronize video signal that is to be played back in a predefined motion, such as in slow motion. In this regard, the at least one memory and the stored computer program code may be configured, with the at least one processor, to cause the apparatus to cause the audio object to be differently extended, in an instance in which the audio object is determined to be a transient object, by splitting the transient object into transient segments, inserting silent segments between the transient segments and maintaining the trajectories of the transient object. The at least one memory and the stored computer program code may also be configured, with the at least one processor, to cause the apparatus to cause the audio object to be differently extended, in an instance in which the audio object is determined to be a non-transient object, by repeating the non-transient object with a trajectory that varies over time in correspondence to the predefined motion of the video signal.

The at least one memory and the stored computer program code may be further configured, with the at least one processor, to cause the apparatus of an example embodiment to determine a level for each of the one or more objects. In this regard, the at least one memory and the stored computer program code may be configured, with the at least one processor, to cause the apparatus to cause the audio object to be differently extended by maintaining the level of the transient object and repeating the non-transient object with a level that varies over time in correspondence to the predefined motion of the video signal. The at least one memory and the stored computer program code may be configured, with the at least one processor, to cause the apparatus of an example embodiment to insert silent segments between the transient segments by inserting silent segments that have a length that corresponds to the predefined motion of the video signal. In this embodiment, the first speed of the audio and video signals may be a multiple of the predefined motion speed at which the video signal are to be played back. As such, the at least one memory and the stored computer program code may be configured, with the at least one processor, to cause the apparatus of this example embodiment to insert silent segments that have a length as selected such that the silent segments in combination with a corresponding transient segment have a collective length that is the multiple of a length and the corresponding transient segment at the first speed. In an instance in which the first speed of the audio and video signals is a multiple of the predefined motion speed at which the video signal is to be played back, the at least one memory and the stored computer program code may be configured, with the at least one processor to cause the apparatus of an example embodiment to repeat the non-transient objects so to have a resulting length that is the multiple of a length of the non-transient object at the first speed. In an example embodiment, the at least one memory and the stored computer program code may be further configured, with the at least one processor, to cause the apparatus to cause the audio object to be rendered after having been differently extended.

In a further example embodiment, a computer program product is provided that includes at least one computer-readable storage medium having computer-executable program code instructions stored therein with the computer-executable program code instructions including program code instructions to, when executed by at least one processor, cause the determination of a trajectory for each of one or more audio objects of an audio signal. The computer-executable program code instructions of this example embodiment also include program code instructions to determine each of the audio objects to be a transient object or a non-transient object and to cause an audio object to be differently extended depending upon whether the audio object is determined to be a transient object or a non-transient object so as to synchronize video signal that is to be played back in a predefined motion, such as in slow motion. In regards to causing the audio object to be differently extended, the computer-executable program code instructions may include program code instructions in an instance in which the audio object is determined to be a transient object to split the transient object into transient segments, insert in silent segments between the transient segments and maintain the trajectory of the transient object. The computer-executable program code instructions for causing the audio object to be differently extended may also include program code instructions in an instance in which the audio object is determined to be a non-transient object to repeat the non-transient object with a trajectory that varies over time in correspondence to the predefined motion of the video signal.

In yet another example of embodiment, an apparatus is provided that includes means, such as a processor, processing circuitry or the like, for determining a trajectory for each of one or more audio objects of an audio signal. The apparatus of this example embodiment also includes means, such as a processor, processing circuitry or the like, for determining each of the audio objects to be a transient object or a non-transient object. The apparatus of this example embodiment also includes means, such as a processor, processing circuitry or the like, for causing an audio object to be differently extended depending upon whether the audio object is determined to be a transient object or a non-transient object so as to synchronize video signal that is to be played back in a predefined motion, such as in slow motion. In this regard, the means for causing the audio object to be differently extended may include, in an instance in which the audio object is determined to be a transient object, means, such as a processor, processing circuitry or the like, for splitting the transient object into transient segments, means, such as a processor, processing circuitry or the like, for inserting silent segments between the transient segments and means, such as a processor, processing circuitry or the like, for maintaining the trajectories of the transient object. The means for causing the audio object to be differently extended may also include means, such as a processor, processing circuitry or the like, for repeating the non-transient object with a trajectory that varies over time in correspondence with the predefined motion of the video signal.

In an example embodiment, a method is provided that includes separating an audio signal into one or more audio objects and determining a trajectory for each of the one or more audio objects. The method of this example embodiment also includes associating, with a processor, at least a portion of the visual image with one or more audio objects and determining the trajectory of the one or more audio objects at a time at which the at least a portion of the visual image was captured. The method of this example embodiment also includes causing the visual image and the audio objects to be rendered with the one or more audio objects being rendered in accordance with the trajectory at the time at which the at least the portion of visual image was captured.

In an embodiment to which the visual image includes a still image, the method may determine the trajectory of the one or more audio objects at the time at which at least a portion of visual image was captured by determining the trajectory of the one or more audio objects at the time at which the still image was captured. In an embodiment to which the visual image comprises a series of images and the at least a portion of visual image includes a stationary part of the series of images, the method may determine the trajectory of the one or more audio objects at the time at which at least a portion of visual images was captured by determining the trajectory of the one or more audio objects at the time at which the stationary part of the series of images was captured. In this example embodiment in which the series of images also includes one or more moving parts, the method may further include correlating the trajectory of one or more audio objects to the one or more moving parts. In this example embodiment, the one or more audio objects that are associated with the stationary part of the series of images may include all audio objects other than the one or more audio objects correlated to the one or more moving parts to this series of images. In response to removal of a part of the series of images, the method of this example embodiment may remove the one or more audio objects correlated to the part of the series of images that is removed.

In another example embodiment, an apparatus is provided that includes at least one processor and at least one memory storing computer program code with the at least one memory and stored computer code being configured, with the at least one processor, to cause the apparatus to at least separate an audio signal into one or more audio objects and to determine a trajectory for each of the one or more audio objects. The at least one memory and stored computer program code are configured, with the at least one processor, to cause the apparatus of this example embodiment to associate at least a portion of the visual image with one or more audio objects and to determine the trajectory of the one or more audio objects at the time at which the at least a portion of visual image was captured. The at least one memory and stored computer program code may be configured, with the at least one processor, to cause the apparatus of this example embodiment to cause a visual image and the audio objects to be rendered with the one or more audio objects being rendered in accordance to the trajectory at the time at which the at least a portion of the visual image was captured.

In a further example embodiment, a computer program product is provided that includes at least one computer-readable storage medium having computer-executable program code portions stored therein with the computer-executable program code instructions including program code instructions to, when executed by at least one processor, cause an audio signal to be separated into one or more audio objects and to determine a trajectory for each of the one or more audio objects. The computer-executable program code instructions of this example embodiment may also include program code instructions to, when executed by the at least one processor, cause the association of at least a portion of a visual image with one or more audio objects and to determine the trajectory of the one or more audio objects at the time at which the at least a portion of visual image was captured. The computer-executable program code instructions of this example embodiment may also include program code instructions to, when executed by the at least one processor, cause the visual image and the audio objects to be rendered with the one or more audio objects being rendered in accordance with the trajectory at the time at which the at least a portion of visual image was captured.

In yet another example embodiment, an apparatus is provided at that includes means, such as a processor, processing circuitry or the like, for separating an audio signal into one or more audio objects and means, such as a processor, processing circuitry or the like, for determining a trajectory for each of the one or more audio objects. The apparatus of this example embodiment also includes means, such as a processor, processing circuitry or the like, for associating at least a portion of the visual image with one or more audio objects and means, such as a processor, processing circuitry or the like, for determining the trajectory of the one or more audio objects at a time at which the at least a portion of visual image was captured. The apparatus of this example embodiment may also include means, such as a processor, processing circuitry or the like, for causing the visual image and the audio objects to be rendered with the one or more audio objects being rendered in accordance with the trajectory at the time at which the at least a portion of the visual image was captured.

BRIEF DESCRIPTION OF THE DRAWINGS

Figure 1:
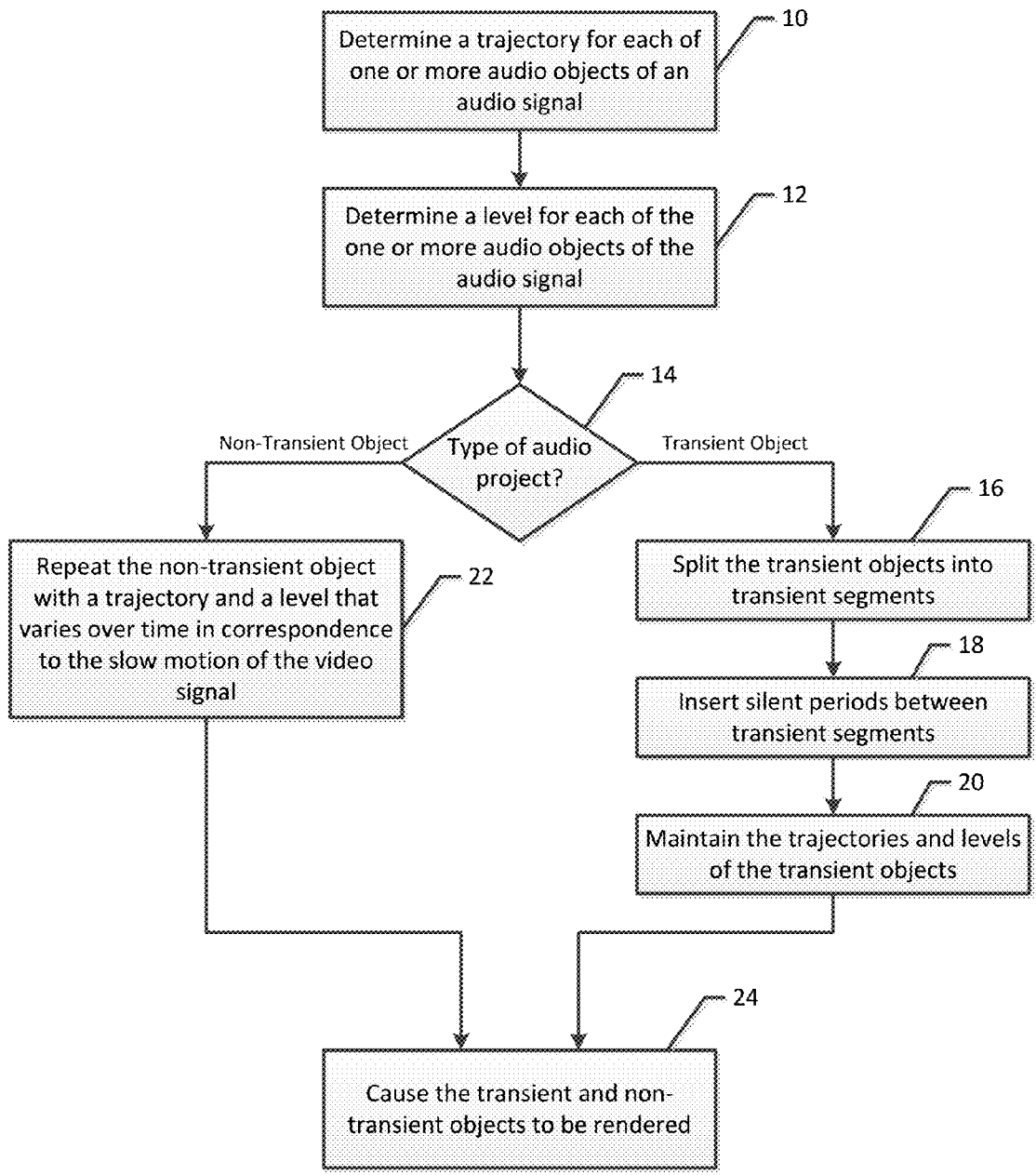
Figure 2:
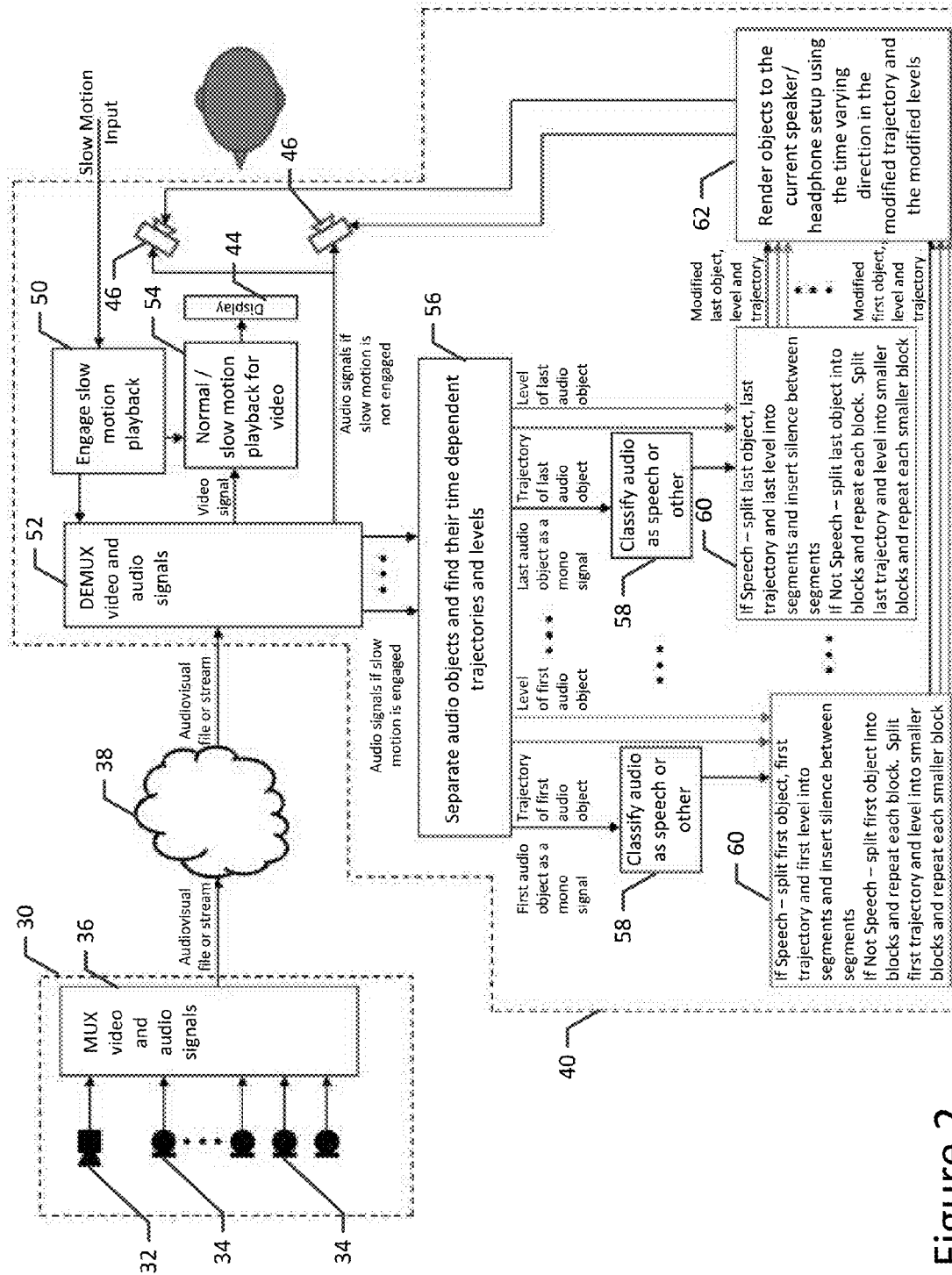
Figure 3:
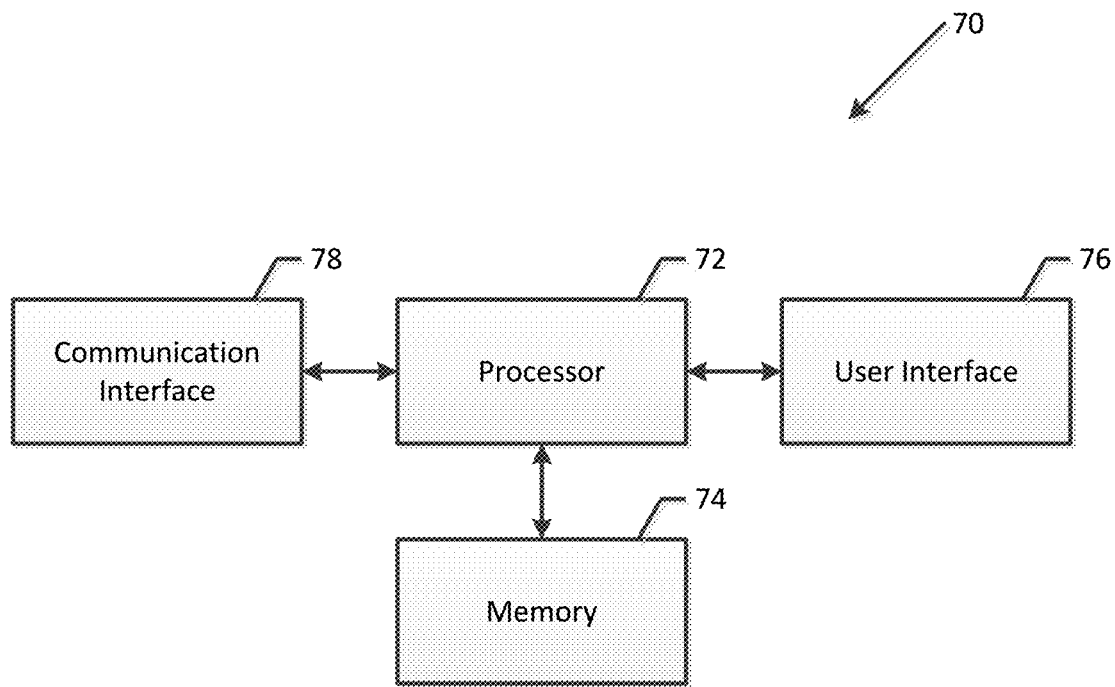
Figure 4:
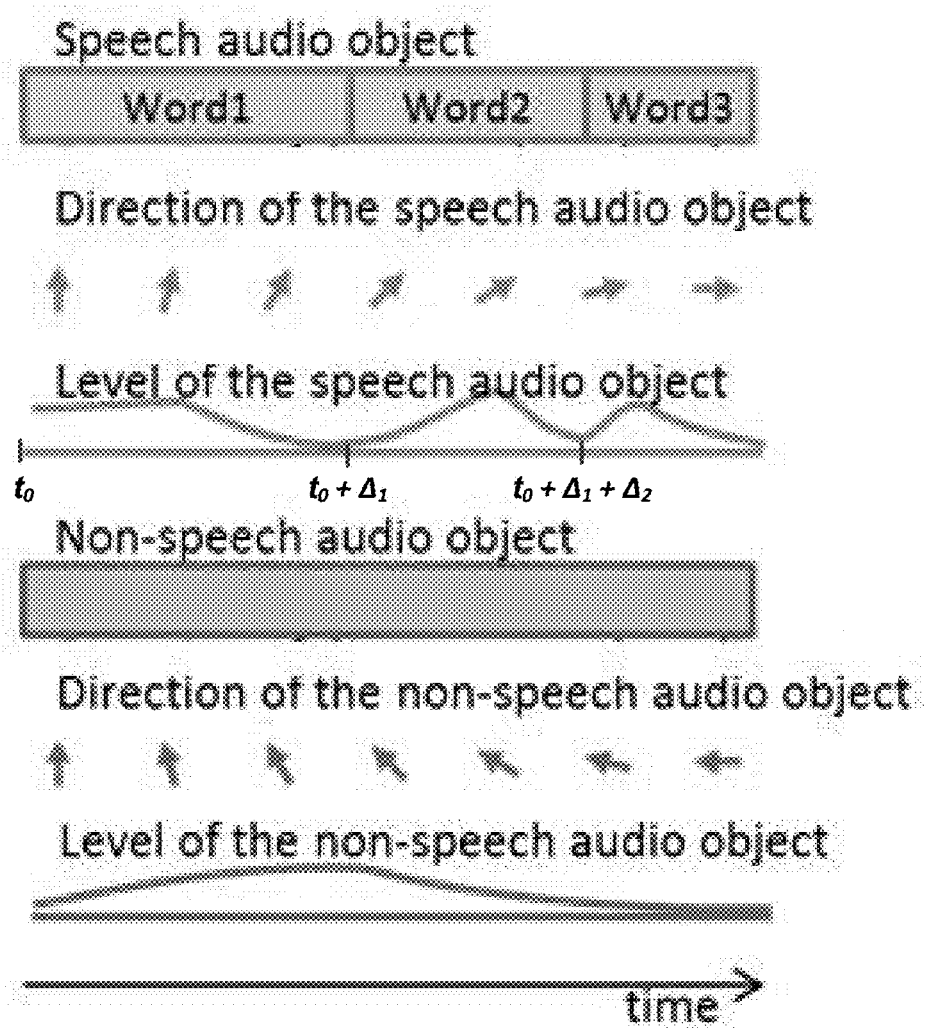
Figure 5:
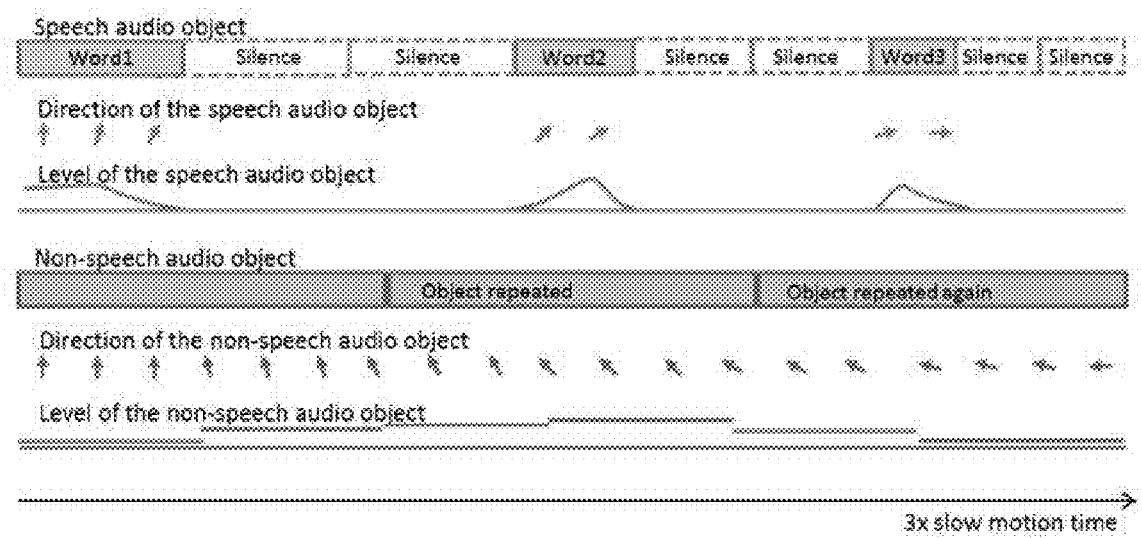
Figure 6:
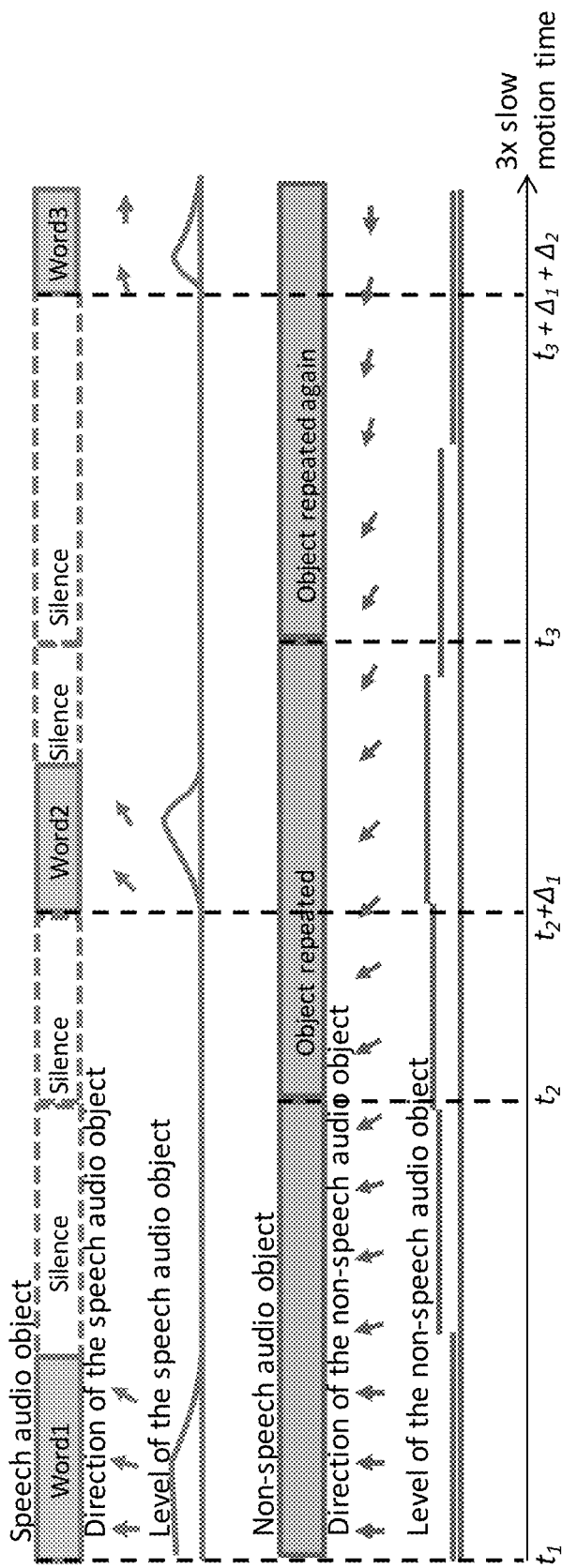
Figure 7:
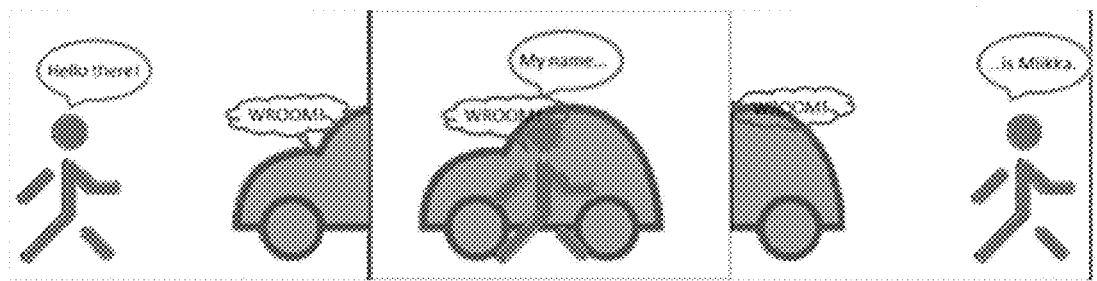
Figure 8:
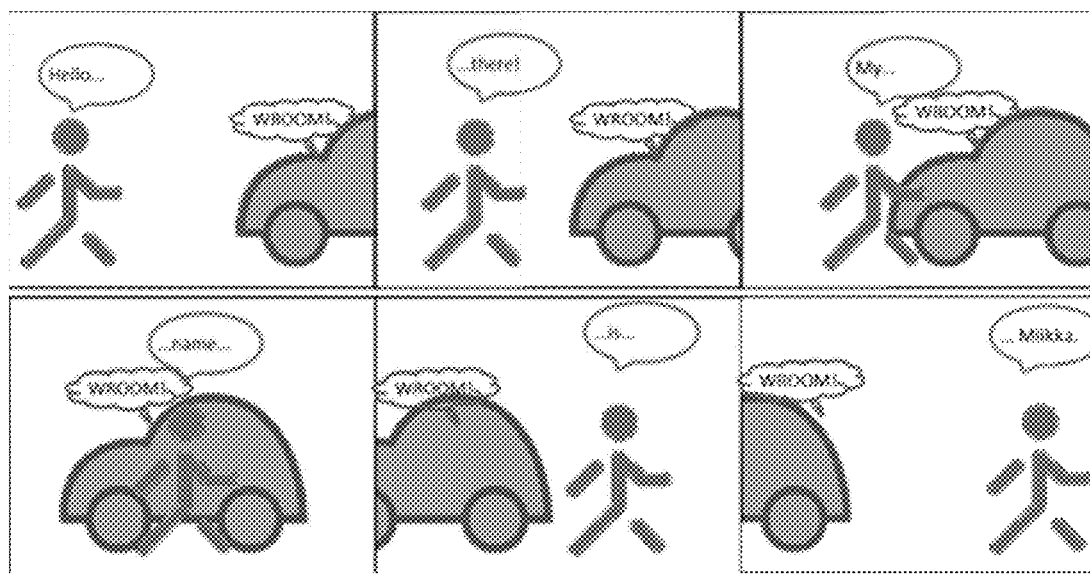
Figure 9:
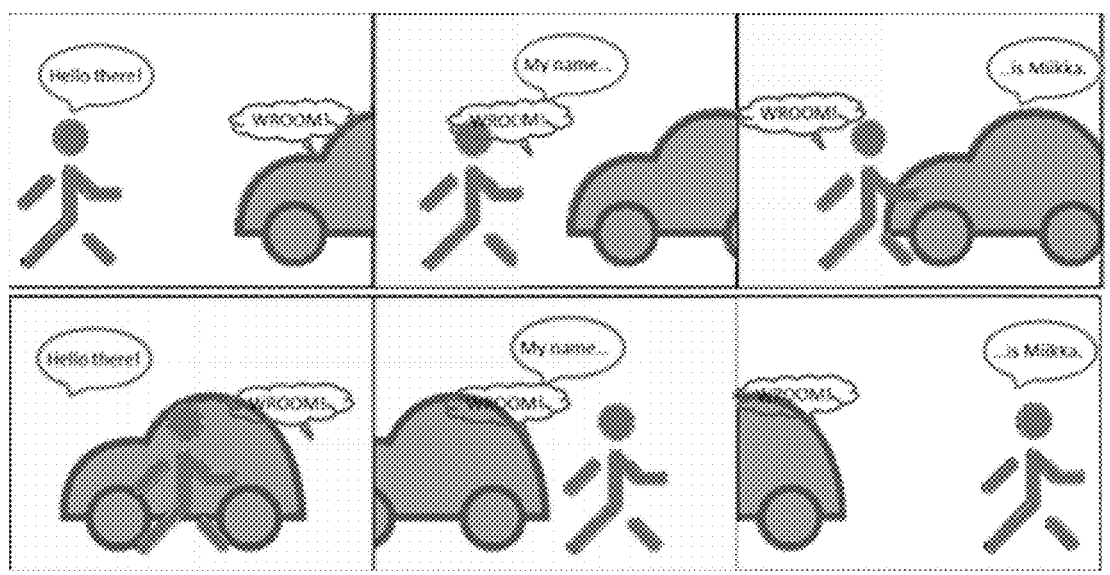
Figure 10:
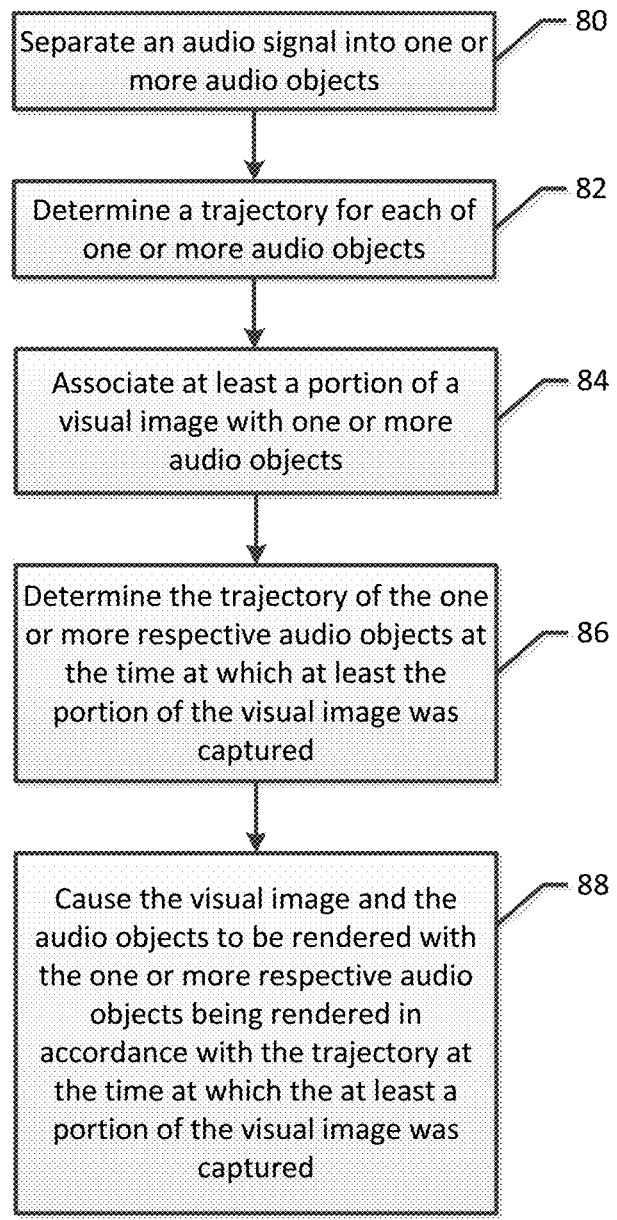
Figure 11:
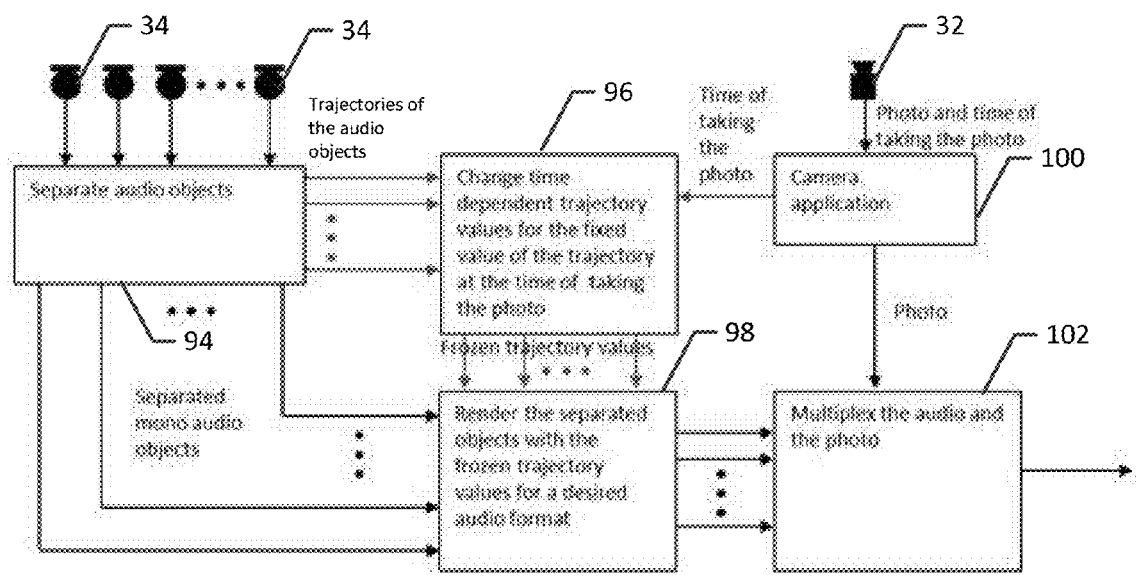
Figure 12:
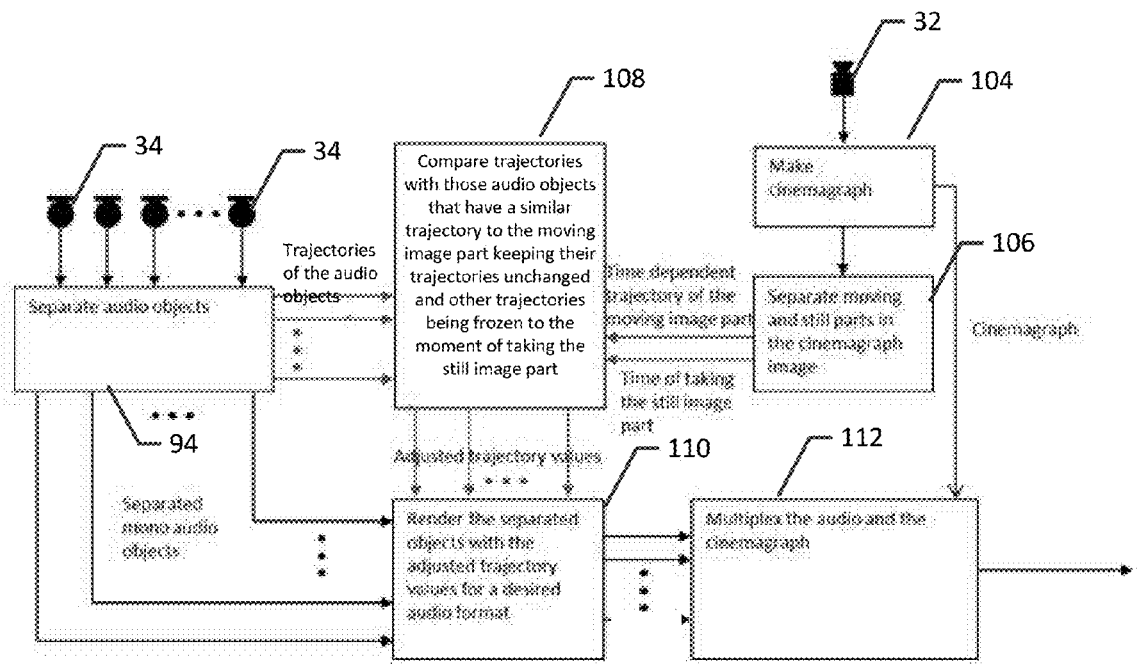
Figure 13:
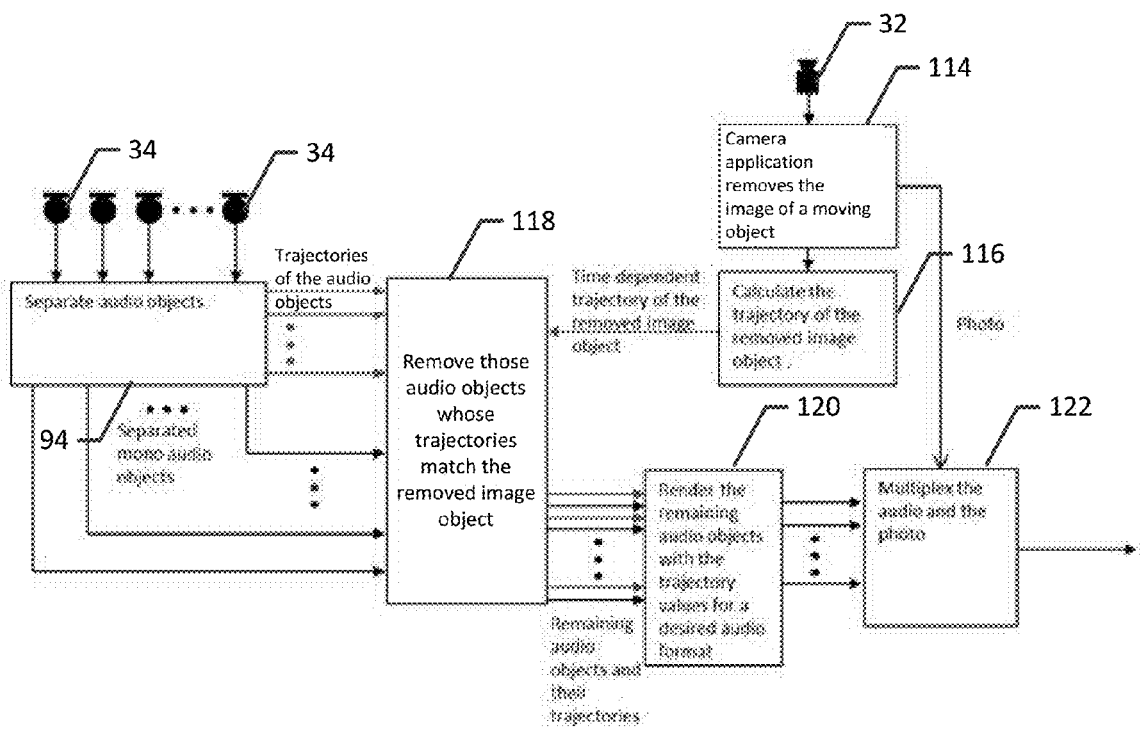

Having thus described aspects of the present disclosure in general terms, reference will now be made to the accompanying drawings, which are not necessarily drawn to scale, and wherein:

FIG. 1 is a flowchart of operations performed in accordance with an example embodiment of the present invention;

FIG. 2 is a more detailed flow diagram of an embodiment of the operations depicted in the flowchart of FIG. 1;

FIG. 3 is a black diagram of an apparatus that may be specifically configured in accordance with an example embodiment of the present invention;

FIG. 4 is a representation of a speech audio object and a non-speech audio object at standard speed;

FIG. 5 is a representation of a speech audio object and a non-speech audio object that have there been differently extended in accordance with an example embodiment of the present invention;

FIG. 6 is a representation of a speech audio object and a non-speech audio object that have there been differently extended in accordance with another example embodiment of the present invention;

FIG. 7 is a representation of a sequence of images at standard speed;

FIG. 8 is a representation of a sequence of images from which both the audio objects of the audio signal and the corresponding video signals are played back in slow motion in accordance with an example embodiment of the present invention;

FIG. 9 is a representation of a series of images in which the audio signals are not slowed and are, instead, played back at standard speed while the video signals are played back in slow motion;

FIG. 10 is a flowchart illustrating operations performed in accordance with another example embodiment of the present invention;

FIG. 11 is a more detailed flow diagram of an example embodiment of the operations depicted in the flowchart of FIG. 10 in which the visual image comprises a still photograph;

FIG. 12 is a more detailed flow diagram of an example embodiment of the operations depicted in the flowchart of FIG. 10 in which the visual image comprises a cinemagraph; and FIG. 13 is a more detailed flow diagram of an example embodiment of the operations depicted in the flowchart of FIG. 10 in which the audio object(s) that correlate with a part of the visual image that has been removed are also removed in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus and computer program product are provided in accordance with an example embodiment of the present invention in order to maintain synchronization, such as both in time and direction, between audio signals and video signals as the video signals are played with modified motion, such as in slow motion. Additionally, a method, apparatus and computer program product are provided in accordance with an example embodiment in order to synchronize the trajectory of the audio signals with a source of the audio signals within an image, such as a still photograph or a stationary part of a cinemagraph, by identifying a single trajectory for the audio signals that would otherwise have a trajectory that moves over time. Further, a method, apparatus and computer program product are provided in accordance with an example embodiment to permit the audio signals associated with a part of an image that is removed to also be removed. As such, the example embodiments of the method, apparatus and computer program product provide for improved synchronization of the audio and video signals under a variety of conditions, thereby correspondingly improving the user experience when viewing and listening to the resulting video and audio, respectively.

As shown in FIG. 1 and in more detail in FIG. 2, a flowchart depicting the operations performed in accordance with an example embodiment of the present invention is depicted. In the example embodiment of FIG. 1, audio signals are synchronized with the video signals even as the replay of the video signals has been modified, such as by being slowed down, such as even in instances in which the video is replayed in slow motion. The operations depicted in FIGS. 1 and 2 and described below may be performed by a variety of electronic devices including, for example, audio and video playback devices, televisions, cameras and computing devices, such as tablet computers, portable laptop computers, personal computer, a computer workstation, mobile telephones, smartphones, personal digital systems (PDAs), gaming devices electronic books, positioning devices (for example, global positioning system (GPS) devices) or any combination of the aforementioned, and other types of video and audio communications systems, both mobile and fixed.

Regardless of the type of device that is configured to perform the operations set forth by FIGS. 1 and 2, the device may include or otherwise be associated with an apparatus that is specifically configured to perform the operations of FIGS. 1 and 2. In this regard, FIG. 3 depicts an apparatus 70 in accordance with an example embodiment that may be specifically configured to perform the operations of FIGS. 1 and 2. As shown, the apparatus of FIG. 3 may include or otherwise be in communication with a processor 72 and a memory device 74, and optionally a user interface 76 and a communication interface 78. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 70 may be embodied by any of a variety of electronic devices, such as an audio/video playback device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 72 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 72 may be configured to execute instructions stored in the memory device 74 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, an audio/video playback device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 70 of an example embodiment may optionally also include or otherwise be in communication with a user interface 76. The user interface may include one or more inputs, such as an input that defines the speed at which the audio and video signals are to be replayed as described below. As such, the user interface may include a touch screen display, a keyboard, a mouse, a joystick or other input/output mechanisms. In some embodiments, the user interface, such as a display, speakers, or the like, may also be configured to provide audio and video output to the user. In an embodiment in which the apparatus includes a user interface, the user interface is in communication with the processor 72 such that an indication of the user input may be provided to the processor. However, even in an instance in which the apparatus does not include a user interface, the apparatus, such as the processor, is configured to receive the input defining the speed at which the audio and video signals are to be replayed. In an example embodiment in which the apparatus does include the user interface, however, the processor may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 74, and/or the like).

The apparatus 70 of the illustrated embodiment may also optionally include a communication interface 78 that may be any means such as a device or circuitry embodied in either hardware or a combination of hardware and software that is configured to receive and/or transmit data from/to a communications device in communication with the apparatus. For example, the communication interface may be configured to receive audio and video signals from various sources and/or to provide synchronized audio and video signals to various output devices, such as an external display and speakers. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As shown in block 10 of FIG. 1, the apparatus 70 may include means, such as the processor 72 or the like, for determining a trajectory for each of one or more, e.g., a plurality of, audio objects of an audio signal. As shown in FIG. 2 in more detail, the audio signals of an example embodiment may be stereo or multichannel audio signals that have been captured by an image capturing device 30, such as a camera, a video recorder, a mobile device, such as a smartphone, a personal digital assistant (PDA) or the like, or a computing device, such as a tablet computer, a personal computer, a laptop computer or the like. Regardless of the manner in which the image capturing device is embodied, the image capturing device may include a camera 32 for capturing video signals and a plurality of microphones 34 for capturing the corresponding audio signals, such as stereo or multichannel audio signals.

Following the capture of the audio and video signals, the audio and video signals of the embodiment depicted in FIG. 2 may be multiplexed as indicated by block 36. As shown, the image capturing device 30 may include circuitry, such as a processor, a multiplexor or the like, for multiplexing the audio and video signals prior to provision of the audio and video signals to a playback device 40, such as an audio/video playback device or other electronic device as described above. Alternatively, the image capturing device may separately provide the audio and video signals to the playback device without their having been multiplexed.

The audio and video signals may be provided by the image capturing device 30 to the playback device 40 directly, such as via direct connection, or via a network connection as depicted by network 38. Additionally or alternatively, the audio and video signals that have been captured by the image capturing device may be stored, such as by the image capturing device, by a storage device within the network, by the playback device or otherwise, and then subsequently provided to the playback device, such as upon demand.

In the illustrated embodiment in which the audio and video signals have been multiplexed, upon receipt by the playback device 40, the audio and video signals may be de-multiplexed by a processor, a demultiplexor or the like as shown at block 52. In an instance in which the audio and video signals have not been multiplexed, however, the playback device need not perform demultiplexing. In the illustrated embodiment, the playback device is also configured to receive input, such as from the user, indicating that the video is to be replayed with modified motion, such as in slow motion, and, in some instances, identifying the degree to which the replay of the video signals is to be modified, e.g., slowed. In this regard, the audio and video signals are described herein to be replayed in slow motion by way of example. However, the audio and video signals may be replayed in accordance with any of various predefined motion. The predefined motion causes the audio and video signals to be replayed at a speed that differs from a first speed, such as the standard speed, at which the audio and video signals are played, such as in slow motion as described below by way of example but not of limitation. For example, the slow motion replay may be defined in terms of the multiple of the slow motion speed at which the video signals are to be played back relative to the standard speed of the audio and video signals. For example, the standard speed may be 2 times, 3 times or more relative to the slow motion speed at which the video signals are to be replayed. In an instance in which an input is provided indicative of the video signals being replayed in slow motion, the playback device, such as a processor or the like, may engage slow motion playback at block 50 which correspondingly causes both the audio and video signals to be processed and subsequently played back at the designated slow motion speed. For example, the de-multiplexed video signals may be played back at standard speed in the absence of a slow motion input, but are played back in slow motion at the designated slow motion speed in response to the slow motion input as indicated by block 54. Additionally, in an instance in which there is no slow motion input and the video signals are to be replayed at standard speed, the de-multiplexed audio signals may also be provided to the speakers 46 for replay at standard speed. However, in an instance in which slow motion input is provided, the audio signals may be further processed as described below in order to maintain synchronization with the video signals.

As depicted in block 56 of FIG. 2, in an instance in which the audio and video signals are to be replayed in slow motion, the apparatus 70 embodied by the playback device 40, such as the processor 72 or the like, may be configured to initially separate the audio signals into one or more audio objects. The processor may be configured to separate the audio signals into audio objects in a variety of manners, such as described by Makino, Shoji et al., "Blind Source Separation of Convolutive Mixtures of Speech in Frequency Domain", IEICE TRANSACTIONS on Fundamentals of Electronics, Communications and Computer Sciences, Vol. E88-A (July 2005); Mukai, Ryo et al., "Robust real-time blind source separation for moving speakers in a room", ICASSP 20 and/or Lucas Parra et al., "On-line Convolutive Blind Source Separation of Non-Stationary Signals", Journal of VLSI signal processing systems for signal, image and video technology, August 2000, Volume 26, Issue 1-2, pp 39-46.

As shown in block 10 of FIG. 1 and is also depicted in block 56 of FIG. 2, the apparatus 70 may include means, such as the processor 72 or the like, for determining a trajectory for each of the one or more audio objects of an audio signal. The trajectories of the audio objects are the time dependent directions from which the audio objects appear to originate. Thus, the trajectory of an audio object may vary over the course of time if the source of the audio signal is in motion. The processor may be configured to determine the trajectories of the audio objects in various manners including those described by Makino, Shoji et al., "Blind Source Separation of Convolutive Mixtures of Speech in Frequency Domain", IEICE TRANSACTIONS on Fundamentals of Electronics, Communications and Computer Sciences, Vol. E88-A (July 2005); Mukai, Ryo et al., "Robust real-time blind source separation for moving speakers in a room", ICASSP 20 and/or Lucas Parra et al., "On-line Convolutive Blind Source Separation of Non-Stationary Signals", Journal of VLSI signal processing systems for signal, image and video technology, August 2000, Volume 26, Issue 1-2, pp 39-46.

The apparatus 70 may also optionally include means, such as the processor 72 or the like, for determining a level for each of the one or more audio objects of the audio signal, as depicted by block 12 of FIG. 1 and also by block 56 of FIG. 2. The level of an audio object may also be time dependent and, as such, may vary over the course of time. While the processor may be configured to determine the level of an audio object in various manners, the processor of an example embodiment may determine the energy, e.g., the average energy, of the audio object in each of a plurality of time segments with the energy, in turn, defining the level of the audio object during the respective time segment. The time segments may have a variety of different lengths, but, in one embodiment, may be 20 milliseconds.

For each audio object of an audio signal, the apparatus 70 may include means, such as the processor 72 or the like, for determining each audio object to be either a transient object or a non-transient object. See block 14 of FIG. 1. In this regard, a transient object is an audio object that has substantial variance over a relatively short period of time, such as a short duration tone, a click-type signal or a noise burst, while a non-transient object is an audio object that has little variance over a period of time. In this regard, the amount of variance that distinguishes a transient object from a non-transient object may be predefined, along with the time period over which the variance is determined. In an example embodiment, the transient and non-transient objects include speech and non-speech objects, respectively. Thus, the apparatus, such as the processor, may be configured to determine each of the audio objects as either a speech object or a non-speech object, such as shown in blocks 58 of FIG. 2 and as described, for example, by Jongseo Sohn, et al., "A statistical model-based voice activity detection", Signal Processing Letters, IEEE (January 1999).

In an example embodiment, the apparatus 70, such as the processor 72, may be configured to determine each audio object to be either a transient object or a non-transient object by identifying each transient object and by then classifying all remaining objects, that is, all audio objects that have not been identified to be a transient object, to be non-transient objects. As many, if not most or all, audio signals that are not continuous possess some transients, the apparatus, such as the processor, of an example embodiment may determine an audio object having at least a predefined threshold amount of transient features to be a transient object. The predefined threshold amount of transient features may be defined in various manners, such as a predefined percent of the audio object being comprised of transient features and/or a predefined magnitude of the transient features. The apparatus, such as the processor, of this example embodiment may determine those audio objects that are not determined to be transient objects to be non-transient objects, or the apparatus, such as the processor, may be configured to determine those audio objects that have less than the predefined threshold amount of transient features to be non-transient objects.

The apparatus 70 of an example embodiment also includes means, such as the processor 72 or the like, for causing respective audio objects, such as the transient and non-transient objects, to be differently extended so as to continue to be synchronized with the video signals that are to be played back in slow motion. With respect to a transient object and as shown in block 16 of FIG. 1, the apparatus may include means, such as the processor 72 or the like, for splitting the transient objects into transient segments. The processor may be configured to split a transient object into segments in various manners, but, in an example embodiment, the transient objects are split into segments that have a length of one word or one sentence. A transient object may be split into segments having a length of one word or one sentence in various manners such as described by G. V. Ramana Rao and J. Srichland, "Word Boundary Detection Using Pitch Variations", Fourth International Conference on Spoken Language (1996); H. Ney, et al., "The RWTH Large Vocabulary Continuous Speech Recognition System", IEEE International Conference on Acoustics, Speech and Signal Processing (ICASSP) (1998); Gin-Der Wu and Chin-Teng Lin, "A Recurrent Neural Fuzzy Network for Word Boundary Detection in Variable Noise-Level Environments", IEEE Transactions on Systems, Man and Cybernetics, Part B: Cybernetics, Volume 31, Issue 1 (2001). Additionally or alternatively, the processor may be configured to split a transient object into segments with the segments being defined by relatively higher level(s) separated by relatively lower level(s).

After splitting the transient objects into transient segments, the apparatus 70 may include means, such as the processor 72 or the like, for inserting silent periods between the transient segments. See block 18 of FIG. 1. In this regard, the processor may be configured to insert silent segments that have a length that corresponds to the slow motion of the video signals. In this regard, the slow motion speed at which the video signals are to be played back may be a multiple of the standard speed of the audio and video signals. As such, the processor may be configured to insert silent segments that have a length that is selected such that the silent segments in combination with the corresponding transient segment have a collective length that is the multiple of the length of the corresponding transient segment at the standard speed. For example, in an instance in which the standard speed is 3 times the slow motion speed at which the video signals are to be played back, the processor may be configured to insert silent segments that are twice the length of the corresponding transient segment such that the silent segments in combination with the corresponding transient segment have a length that is 3 times the length of the corresponding transient segment at standard speed.

As shown at block 20 of FIG. 1, the apparatus 70 of an example embodiment may also include means, such as the processor 72 or the like, for maintaining the trajectories of the transient objects and, in an example embodiment, also maintaining the levels of the transient objects. Thus, each transient object and, in turn, each transient segment of each transient object will appear to originate from the same direction when replayed in slow motion speed as in standard speed and to be replayed at the same level in slow motion speed as in standard speed.

Alternatively, in an instance in which the audio object is determined to be a non-transient object, the apparatus 70 of an example embodiment may include means, such as the processor 72 or the like, for repeating the non-transient object with a trajectory that varies over time in correspondence to the slow motion of the video signals. See block 22 of FIG. 1. By way of example in which the standard speed of the audio and video signals is a multiple, such as 3 times, of the slow motion speed at which the video signals are to be played back, the processor may be configured to repeat the non-transient objects such that each non-transient object has a resulting length, after having been repeated, that is the multiple of the length of the respective non-transient object at the standard speed. For example, in an instance in which the standard speed is 3 times the slow motion speed, the processor may be configured to repeat the non-transient object such that the resulting length, after having been repeated, is 3 times the length of the respective non-transient object at the standard speed. As described below, the trajectory of the non-transient object is also lengthened by the multiple such that the trajectory associated with each portion of the non-transient object extends longer, such as 3 times longer in an instance in which the standard speed is 3 times the slow motion speed, once the non-transient object has been repeated. See also block 60 of FIG. 2 which describes the manner in which the playback device 40, such as the processor, causes the transient and non-transient objects to be differently extended to be synchronized with the video signals that are to be played back in slow motion.

As shown in block 24 of FIG. 1 and block 62 of FIG. 2, the apparatus 70 of an example embodiment may also include means, such as the processor 72, the user interface 76 or the like, for causing the respective audio objects, such as the transient and non-transient objects, to be rendered after having been differently extended. The transient and non-transient objects may be rendered in various manners, such as by panning for speakers or pursuant to a head related transfer function (HRTF) for headphones. As shown in FIG. 2, for example, the transient and non-transient objects may then be provided to the speakers, headphones or other audio output devices 46 in accordance with the trajectories and levels that have been defined in the process that differently extending the transient and non-transient objects. As such, the resulting audio signals may be presented in synchronization with the video images presented in slow motion upon the display 44 to the user 42.

By way of example, FIG. 4 depicts a transient object, such as a speech audio object, and a non-transient object, such as a non-speech audio object, at standard speed. Along with the depiction of the speech and non-speech audio objects, the trajectory and level of the speech and non-speech objects at standard speed are shown. The speech object includes three words such that in an embodiment in which a speech object is split in speech segments that are each one word in length, the speech object includes three speech segments, namely, Word1, Word2 and Word3.

Referring now to FIG. 5, the transient and non-transient objects, such as the speech and non-speech objects, are depicted following synchronization of the transient and non-transient objects with video signals that are to be played in slow motion. In this regard, the standard speed of the audio and video signals shown in FIG. 4 is 3 times the slow motion speed of the video signals that are to be played back in slow motion in FIG. 5. In this example embodiment, the transient object, that is, the speech object, has been split into three transient segments and silent segments have been inserted after each speech segment such that the combination of a speech segment and the silent segments inserted thereafter has a length that is 3 times the length of the respective speech segment at standard speed. In this regard, it is noted that the silent segments inserted following Word2 and Word3 are shorter than the silent segments inserted after Word1 since Word2 and Word3 are also shorter than Word1. As also shown in FIG. 5, the trajectory and the level associated with each speech segment remains the same at slow motion speed as at standard speed, such as indicated by the directional arrows in regards to the trajectory. As illustrated, the silent segments do not have an associated trajectory and level as the silent segments do not generate any audible sound. As a result of the manner in which the non-transient objects are differently extended, the non-speech object is repeated over time in a manner that corresponds to the slow motion of the video signals. For example, in an instance in which the standard speed is 3 times the slow motion speed, the non-speech object is repeated so as to have a resulting length that is 3 times the length of the non-speech object at standard speed. As also shown in FIG. 5, the trajectory of the non-transient object, such as the non-speech object, varies over time in correspondence to the slow motion of the video signals. In this regard, the trajectory of the non-speech signals varies in the same manner as the trajectory varies at standard speed, but the variance in the trajectory is stretched over the longer time period across which the non-transient object is repeated. Thus, the trajectory that is determined for the non-speech signal at each point in time or each segment in time at standard speed is extended by the same multiple, such as 3 times, that the standard speed is in comparison to the slow motion speed.

Similarly, the level of the non-transient object, such as the non-speech object, varies over time in correspondence to the slow motion of the video signals. As described above in conjunction with the trajectory of the non-speech signals, the level of the non-speech signal in slow motion speed may follow the same pattern as the level at standard speed, but the level at slow motion speed is stretched relative to the level at standard speed by the multiple that the standard speed is to the slow motion speed. While the level of the non-speech signal may be extended by the multiple so as to follow the same continuous and smooth curve as the level at standard speed, the level at standard speed may be divided into a plurality of segments with each segment extending for a predefined period of time, such as 20 milliseconds. During a respective period of time, the average level of the non-speech signal at standard speed may be determined. Thereafter, at slow motion speed, the level associated with each segment of the non-speech signal may be extended or multiplied by the multiple, such as 3 times, such that the same plurality of discrete levels are associated with the extended representation of the non-speech signal, albeit with each level extending longer, such as 3 times, relative to the corresponding level at standard speed. As noted above, the level of the extended non-speech signal may be changed from segment to segment more gradually than that depicted in FIG. 5 and, in some embodiments, a non-speech object may be repeated with some overlap so as to mask the boundaries between the repeated non-speech objects.

As described above in conjunction with the embodiment of FIG. 5, the speech object and the non-speech object may each be extended in a manner independent of the other. In some embodiments, however, some parts of the speech object may leek into the non-speech object such that the replay of the non-speech object may be influenced by and/or include aspects of the speech object. Conversely, in some embodiments, some parts of the non-speech object may leek into the speech object such that the replay of the speech object may be influenced by and/or include aspects of the non-speech object. In order to mask the leakage between the speech and non-speech objects, the apparatus 70, such as the processor 72, of an example embodiment may be configured to synchronize the segments of the speech object, e.g., Word 1, Word 2 and Word 3, with the non-speech object during replay in slow motion.

As shown in FIG. 6, for example, the non-speech object may be repeated a number of times dependent upon the slow motion of the video. By way of example, in an instance in which the video is replayed in slow motion such that the standard speed is three times the speed in slow motion, the non-speech object may be repeated three times. Thus, the non-speech object may be repeated beginning at equally spaced initial times $t_1$, $t_2$ and $t_3$ as shown in FIG. 6. In this example embodiment, the apparatus 70, such as the processor 72, the user interface 76 or the like, may be configured to cause the segments of the speech object to be replayed concurrent with different instances of the non-speech objects and at a time relative to the initial time of the respective non-speech object that is consistent with, e.g., equal to, the offset, if any, of the segment of the particular speech object from the beginning of the non-speech object at standard speed. With reference to FIG. 4 which depicts the speech object and the non-speech object at standard speed, the first segment of the speech object, e.g., Word 1, begins with no offset from the start time $t_0$, while the second and third segments of the speech object, e.g., Word 2 and Word 3, begin at offsets of $\Delta_1$ and $\Delta_1+\Delta_2$, respectively. In slow motion, the apparatus, such as the processor, the user interface or the like, may be configured in this example embodiment to replay the first segment of the speech object beginning at the start time $t_1$ with no offset, to replay the second segment of the speech object with the same offset of $\Delta_1$ relative to the initial time $t_2$ of the second instance of the non-speech object and to replay the third segment of the speech object with the same offset $\Delta_1+\Delta_2$ relative to the initial time $t_3$ of the third instance of the non-speech object. Thus, leakage between the speech and non-speech objects may be masked.

By differently extending the transient and non-transient objects in slow motion, the transient objects may continue to be synchronized with the sources of the transient objects, such as the sources of the speech signal, as the video signals are correspondingly slowed. By maintaining the synchronization, not only in time, but also in trajectory, the resulting slow motion audio and video signals will still appear natural to a viewer even though there are silent segments between the transient segments. In this regard, the transient objects cannot generally be repeated in the same manner as the non-transient objects without sounding unnatural. Thus, the silent segments are inserted between transient segments to maintain synchronization while preserving the more natural sound of the transient segments, albeit now at a more deliberate or halting pace when replayed in slow motion. However, the non-transient objects are generally not as dependent upon synchronization to a particular source of the non-transient audio signals, such as a source of a non-speech signal, and a user may, instead, pace more value upon the non-transient objects being continuous without interruptions by silent segments in the same manner in which the transient objects are separated by silent segments. By differently extending the transient and non-transient objects, the resulting audio and video signals may be replayed in slow motion in a manner that remains synchronized and improves the user experience, such as by being more natural sounding.

By way of example, FIG. 7 depicts a series of three video images replayed at standard speed with the corresponding audio signals superimposed thereupon. As shown, the person walking from the left to the right says "Hello there! My name is Miikka.", while the automobile makes a "VROOM" noise and moves from the right to the left.

In an instance in which the video images are replayed in slow motion at half speed such that standard speed is 2 times the slow motion speed, the resulting video images are depicted in FIG. 8. As also shown, the audio signals have been processed in accordance with an example embodiment of the present invention such that the speech objects are differently extended relative to the non-transient objects. In this regard, the speech objects are split into speech segments, each being one word in length, with silent segments inserted between the speech segments. As such, the speech segments remain synchronized with the video images in slow motion, both in terms of time and direction of the speech segments relative to the source of the audio signal. The noise made by the automobile, however, is a non-transient object, that is, a non-speech object, and, as such, is repeated with a trajectory and level that varies over time in correspondence to the slow motion of the video signals. As represented by FIG. 8, the speech and non-speech signals therefore remain synchronized with the slow motion video signals, both in terms of time and trajectory. In contrast, if the audio signals were not differently extended as described pursuant to an embodiment of the present invention, but were, instead, simply repeated 2 times, the audio signals would not be in synchronization with the slow motion video signals at any time other than the first and last video images as shown, for example, in FIG. 9. Thus, the method, apparatus 70 and computer program product of an example embodiment facilitate the synchronization of audio and video signals as the audio and video signals are replayed in slow motion.

In another example embodiment, a method, apparatus 70 and computer program product are provided to define the trajectory of the audio signals associated with at least a portion of a visual image that is stationary such that the audio signals that originate with the stationary portion of a visual image also remain fixed in position, even though the trajectory of the audio signals that were captured may have moved over time. In this embodiment and as illustrated in FIG. 10, the apparatus may include means, such as the processor 70 or the like, for separating the audio signal that had been captured along with a corresponding video signal into one or more, e.g., a plurality of, audio objects. See block 80. For each of the one or more audio objects, the apparatus may also include means, such as the processor or the like, for determining a trajectory of the respective audio object and, in one embodiment, for also determining a level of the respective audio object. See block 82 of FIG. 10.

In addition to capturing the audio signals, a visual image may also be captured by a camera 32 or other image capturing device. The image capturing device may capture a still image that is provided to a camera application 100, along with the time at which the still image is captured as shown in the more detailed flow diagram of FIG. 11. Alternatively, the camera may capture a series of images that form a cinemagraph as shown in the more detailed flow diagram of FIG. 12. In an instance in which the camera captures a cinemagraph, the apparatus 70, such as the processor 72, may separate the portions of the video images that are in motion from the portions of the video images that are still or stationary. See blocks 104 and 106 of FIG. 12. In addition to capturing the video images, the camera may also determine the time at which each image was captured such that the time associated with the capture of the image that includes a stationary portion may be determined, such as by the processor.

As shown in block 84 of FIG. 10, the apparatus 70 may also include means, such as the processor 72 or the like, for associating at least a portion of a visual image with one or more audio objects. In an instance in which the visual image is a still image as depicted in the embodiment of FIG. 11, each of the audio objects captured concurrent with the capture of the still image may be associated with the visual image. However, in an instance in which the visual image comprises a cinemagraph, such as in accordance with the embodiment of FIG. 12, the processor may be configured to associate at least a portion of the visual image, e.g., a stationary portion of the visual image, with one or more respective audio objects by initially correlating the trajectory of one or more audio objects to one or more of the moving parts of the visual image. In this regard, the apparatus, such as the processor, may correlate the trajectory of one or more audio objects to the one or more moving parts of a visual image by identifying those audio objects having a trajectory that cause the respective audio object to appear to originate at the same location within the image as the moving part and to thereafter move in correspondence with the moving part from one image to the next. More particularly and as shown in FIG. 12, the apparatus, such as the processor, may be configured to determine a trajectory for each moving part of an image such that the trajectories of the audio objects may be compared to the trajectories of the moving parts of the image so as to identify the trajectories of the audio objects that match the trajectories of the moving parts of the image. In this embodiment relating to a cinemagraph, the one or more respective audio objects that are associated with the stationary party of the series of images may include all of the audio objects other than the one or more audio objects correlated to or otherwise matched with the one or more moving parts of the series of images.

As shown in block 86 of FIG. 10, the apparatus 70 of this embodiment may also include means, such as the processor 72 or the like, for determining the trajectory of the one or more respective audio objects at a time at which at least a portion of the visual image, e.g., a stationary portion of the visual image, was captured. As shown in block 96 of FIG. 11, in an instance in which the visual image is a still image, the apparatus, such as the processor, may be configured to determine the trajectory of the one or more respective audio objects that have been associated with the still image to be the trajectory of the one or more respective audio objects at the time at which the still image was captured, thereby effectively freezing the trajectory value. Alternatively, as shown in block 108 of FIG. 12, in an instance in which the visual image comprises a series of images and at least a portion of the visual image includes a stationary part, the apparatus, such as the processor, may be configured to determine the trajectory of the one or more respective audio objects at the time at which at least a portion of the visual image, such as the one or more stationary parts of the visual image, was captured by determining the trajectory of the one or more respective audio objects at the time at which the stationary part(s) of the series of images was captured.

As shown in block 88 of FIG. 10, the apparatus 70 of this example embodiment may also include means, such as the processor 72, the user interface 76 or the like, for causing the visual image and the audio objects to be rendered with the one or more respective audio objects being rendered in accordance with the trajectory at the time at which the at least a portion of the visual image was captured. The audio and video signals may be rendered in various manners, such as by panning for speakers or pursuant to HRTF for headphones. In the context of a still image, for example, as shown in block 98 of FIG. 11, the visual image and the audio objects may be rendered with the audio objects being rendered in accordance with the trajectory at the time at which the still image was captured. In an instance in which a cinemagraph is captured as shown in FIG. 12, a visual image and the audio objects may be rendered with the audio objects associated with the stationary part of the series of images being rendered in accordance with the trajectory of the audio objects associated with the stationary part of the series of images at the time at which the image that includes the stationary part of the series of images was captured. See block 110 of FIG. 12. As shown in block 102 of FIG. 11 and block 112 of FIG. 12, the audio and video signals may then be multiplexed prior to storage, play back or the like. As such, the method, apparatus and computer program product of this example embodiment may permit audio and video signals to be synchronized even though the audio signals that are captured may be in motion and the image or at least a portion of the image is stationary such that the audio signals associated with a still image or a stationary part of a cinemagraph also appear to be fixed in a position that corresponds to the still image or the stationary part of the cinemagraph.

In another example embodiment, a method, apparatus 70 and computer program product are provided in which the audio signals associated with a part of a visual image that is removed are also removed such that the resulting combination of the audio and video signals is consistent. As such, the apparatus of this example embodiment may include means, such as the processor 72 or the like, for removing one or more audio objects in response to the removal of a part of the series of images with the one or more audio objects that are removed being correlated to the part of the series of images that is removed. As described above in conjunction with the embodiment of FIG. 12, the one or more audio objects may be correlated to the part of the series of images that is removed based upon a determination that the trajectory of the one or more audio signals corresponds to the location of the part of the visual image that is removed, such as by corresponding to the trajectory of the part of the visual image that is removed, such that the one or more audio objects appear to originate from the part of the visual image that is removed. As shown in FIG. 13, for example, the image captured by a camera 32 or other image capturing device may include a part that is removed by a camera application as shown in block 114 and the apparatus, such as the processor, may determine the trajectory, that is, the location, of the part of the visual image that is removed as shown in block 116.

The apparatus 70 of this example embodiment, such as the processor 72, may also be configured to compare the trajectories of the audio objects to the trajectory of the part of the visual image that has been removed and to identify the audio objects having trajectories that match the trajectory of the part of the visual image that has been removed. See block 118 of FIG. 13. The audio objects that have trajectories that match the trajectory of the part of the visual image that has been removed may also be removed from the audio signal such that the remaining audio objects may be rendered in accordance with a desired audio format and consistent with the trajectories of the respective audio objects as shown in block 120, such as by panning for speakers or pursuant to HRTF for headphones. The rendered audio signals and the video signals may then be multiplexed to generate an image in which part of the video image that was captured has been removed and the audio signals that correspond to the removed part of the captured video image have also been removed. See block 122. As such, the resulting audio and video signals remain synchronized in this example embodiment notwithstanding the removal of a part of the video image that was captured.

As described above, FIGS. 1, 2 and 10-13 illustrates flowcharts of an apparatus 70, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 74 of an apparatus employing an embodiment of the present invention and executed by a processor 72 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
   determining a trajectory for each of one or more audio objects of an audio signal;
   determining each of the audio objects to be a transient object or a non-transient object; and
   causing, with a processor, a respective audio object to be differently extended depending upon whether the audio object is determined to be a transient object or a non-transient object so as to synchronize a video signal that is to be played back in a predefined motion, wherein causing the respective audio object to be differently extended comprises:
      in an instance in which the respective audio object is determined to be a transient object, splitting the transient object into transient segments, inserting silent segments between the transient segments and maintaining the trajectories of the transient object; and
      in an instance in which the respective audio object is determined to be a non-transient object, repeating the non-transient object with a trajectory that varies over time in correspondence to the predefined motion of the video signal.

2. A method according to claim 1 further comprising determining a level for each of the one or more audio objects, wherein causing the respective audio object to be differently extended comprises maintaining the level of the transient object and repeating the non-transient object with a level that varies over time in correspondence to the predefined motion of the video signal.

3. A method according to claim 1 wherein inserting silent segments between the transient segments comprises inserting silent segments that have a length that corresponds to the predefined motion of the video signal.

4. A method according to claim 3 wherein a first speed of the audio and video signals is a multiple of a predefined motion speed at which the video signal is to be played back, and wherein inserting silent segments comprises inserting silent segments that have a length that is selected such that the silent segments in combination with a corresponding transient segment have a collective length that is the multiple of a length of the corresponding transient segment at the first speed.

5. A method according to claim 1 wherein a first speed of the audio and video signals is a multiple of a predefined motion speed at which the video signal is to be played back, and wherein repeating the non-transient object comprises repeating a respective non-transient object to have a resulting length that is the multiple of the length of the respective non-transient object at the first speed.

6. A method according to claim 1 wherein the transient and non-transient objects comprise speech and non-speech objects, respectively.

7. A method according to claim 1 further comprising causing the respective audio object to be rendered after having been differently extended.

8. A computer program product comprising at least one non-transitory computer-readable storage medium having computer-executable program code instructions stored therein, the computer-executable program code instructions comprising program code instructions to, when executed by at least one processor, cause performance of the method of claim 1.

9. An apparatus comprising at least one processor and at least one memory storing computer program code, wherein the at least one memory and stored computer program code are configured, with the at least one processor, to cause the apparatus to at least:
   determine a trajectory for each of one or more audio objects of an audio signal;
   determine each of the audio objects to be a transient object or a non-transient object; and
   cause a respective audio object to be differently extended depending upon whether the audio object is determined to be a transient object or a non-transient object so as to synchronize a video signal that is to be played back in a predefined motion, wherein the at least one memory and stored computer program code are configured, with the at least one processor, to cause the apparatus to cause the respective audio object to be differently extended by:
      in an instance in which the respective audio object is determined to be a transient object, splitting the transient object into transient segments, inserting silent segments between the transient segments and maintaining the trajectories of the transient object; and
      in an instance in which the respective audio object is determined to be a non-transient object, repeating the non-transient object with a trajectory that varies over time in correspondence to the predefined motion of the video signal.

10. An apparatus according to claim 9 wherein the at least one memory and stored computer program code are further configured, with the at least one processor, to cause the apparatus to determine a level for each of the one or more audio objects, wherein the at least one memory and stored computer program code are configured, with the at least one processor, to cause the apparatus to cause the respective audio object to be differently extended by maintaining the level of the transient object and repeating the non-transient object with a level that varies over time in correspondence to the predefined motion of the video signal.

11. An apparatus according to claim 9 wherein the at least one memory and stored computer program code are configured, with the at least one processor, to cause the apparatus to insert silent segments between the transient segments by inserting silent segments that have a length that corresponds to the predefined motion of the video signal.

12. An apparatus according to claim 11 wherein a first speed of the audio and video signals is a multiple of a predefined motion speed at which the video signals are to be played back, and wherein the at least one memory and stored computer program code are configured, with the at least one processor, to cause the apparatus to insert silent segments by inserting silent segments that have a length that is selected such that the silent segments in combination with a corresponding transient segment have a collective length that is the multiple of a length of the corresponding transient segment at the first speed.

13. An apparatus according to claim 9 wherein a first speed of the audio and video signals is a multiple of a predefined motion speed at which the video signals are to be played back, and wherein the at least one memory and stored computer program code are configured, with the at least one processor, to cause the apparatus to repeat the non-transient object by repeating a respective non-transient object to have a resulting length that is the multiple of the length of the respective non-transient object at the first speed.

14. An apparatus according to claim 9 wherein the transient and non-transient objects comprise speech and non-speech objects, respectively.

15. An apparatus according to claim 9 wherein the at least one memory and stored computer program code are further configured, with the at least one processor, to cause the apparatus to cause the respective audio object to be rendered after having been differently extended.

16. A method comprising:
separating an audio signal into one or more audio objects;
determining a trajectory for each of the one or more audio objects;
separating a video signal into one or more video objects;
determining a trajectory for each of the one or more video objects;
associating, with a processor, at least one of the one or more video objects with at least one of the one or more audio objects;
causing at least one of the video objects that is associated with the at least one audio object to be displayed such that the at least one video object is stationary; and
causing at least one of the audio objects that is associated with the at least one video object that is displayed so as to be stationary to be played back using a trajectory that is at least partially based on the trajectory that was determined for the at least one video object that is displayed so as to be stationary, wherein causing at least one of the audio objects to be played back comprises causing the at least one of the audio objects to be extended at the trajectory while the at least one video object is displayed.

17. A method according to claim 16 wherein the visual image comprises a still image, and wherein determining the trajectory of the one or more respective audio objects comprises determining the trajectory of the one or more respective audio objects at the time at which the still image was captured.

18. A method according to claim 16 wherein the visual image comprises a series of images, wherein the at least a portion of the visual image comprises a stationary part of the series of images, and wherein determining the trajectory of the one or more respective audio objects comprises determining the trajectory of the one or more respective audio objects at the time at which the stationary part of the series of images was captured.

19. A method according to claim 18 wherein the series of images also includes one or more moving parts, wherein the method further comprises correlating the trajectory of one or more audio objects to the one or more moving parts, and wherein the one or more respective audio objects that are associated with the stationary part of the series of images comprises all audio objects other than the one or more audio objects correlated to the one or more moving parts of the series of images.

20. A method according to claim 19 further comprising, in response to removal of a part of the series of images, removing the one or more audio objects correlated to the part of the series of images that is removed.

* * * * *

UNITED STATES PATENT AND TRADEMARK OFFICE
CERTIFICATE OF CORRECTION

| | | |
|---|---|---|
| PATENT NO. | : 9,508,386 B2 | Page 1 of 1 |
| APPLICATION NO. | : 14/317861 | |
| DATED | : November 29, 2016 | |
| INVENTOR(S) | : Vilermo et al. | |

It is certified that error appears in the above-identified patent and that said Letters Patent is hereby corrected as shown below:

On the Title Page

Item [71], delete "Nokia Corporation" and insert --Nokia Technologies Oy--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*